US008169506B2

(12) United States Patent
Hayashi

(10) Patent No.: US 8,169,506 B2
(45) Date of Patent: May 1, 2012

(54) IMAGE STORAGE APPARATUS HAVING CONTINUOUS-SHOOTING FUNCTION

(75) Inventor: Tetsuya Hayashi, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 979 days.

(21) Appl. No.: 12/077,513

(22) Filed: Mar. 19, 2008

(65) Prior Publication Data

US 2008/0232719 A1 Sep. 25, 2008

(30) Foreign Application Priority Data

Mar. 22, 2007 (JP) ................................ 2007-074224

(51) Int. Cl.
*H04N 5/76* (2006.01)

(52) U.S. Cl. ................................................ 348/231.99

(58) Field of Classification Search ............ 348/231.99, 348/231.1–231.9; 382/305, 306; 707/662, 707/663

See application file for complete search history.

(56) References Cited

U.S. PATENT DOCUMENTS 6,826,354 B2 * 11/2004 Tezuka ........................ 382/218
7,406,046 B2 * 7/2008 Di Gregorio ................. 370/232
7,444,491 B1 * 10/2008 Steinbusch .................. 711/170
7,558,891 B2 * 7/2009 Shih ............................ 710/52
7,583,299 B2 * 9/2009 Kuriyama et al. ....... 348/231.99
2002/0178338 A1 * 11/2002 Shibuya et al. .............. 711/173
2003/0112347 A1 * 6/2003 Wyman .................... 348/231.99
2005/0058148 A1 * 3/2005 Castellano et al. .......... 370/428
2005/0078197 A1 * 4/2005 Gonzalez ................ 348/231.99
2005/0102450 A1 * 5/2005 Shih .............................. 710/52
2006/0013342 A1 * 1/2006 Rhee et al. .................... 375/340
2007/0150138 A1 * 6/2007 Plante ............................ 701/35
2008/0136940 A1 * 6/2008 Srikanth et al. .......... 348/231.99

FOREIGN PATENT DOCUMENTS

JP 07-213671 A 8/1995
JP 2000-125183 A 4/2000
JP 2004-304418 A 10/2004
JP 2006-067172 A 3/2006

* cited by examiner

*Primary Examiner* — Nhan T Tran
*Assistant Examiner* — Tuan Le
(74) *Attorney, Agent, or Firm* — Holtz, Holtz, Goodman & Chick, P.C.

(57) ABSTRACT

An image storage apparatus comprises an image capture unit configured to sequentially capture images of a subject, a storage unit including storage areas to store the images of the subject captured by the image capture unit, a storage controller configured to overwrite a storage area which is permitted to be overwritten with an image of the subject captured by the image capture unit, a life setting unit configured to set a life of the storage area which is overwritten by the storage controller, a life controller configured to change gradually the life of the storage area set by the life setting unit, a determination unit configured to determine whether the life of the storage area changed by the life controller expires or not, and a permission unit configured to permit to overwrite a storage area when the determination unit determines that the life of the storage area expires.

15 Claims, 11 Drawing Sheets

STORAGE STATE A
LIFE
BUFFER INDEX
0 4 8 2 12 1 6 3 16 5 10 7
1 2 3 4 5 6 7 8 9 10 11 12
STORAGE STATE B
LIFE
BUFFER INDEX
19 3 7 1 11 0 5 2 15 4 9 6
1 2 3 4 5 6 7 8 9 10 11 12
STORAGE STATE C
LIFE
BUFFER INDEX
18 2 6 0 10 7 4 1 14 3 8 5
1 2 3 4 5 6 7 8 9 10 11 12
STORAGE STATE D
LIFE
BUFFER INDEX
17 1 5 11 9 6 3 0 13 2 7 4
1 2 3 4 5 6 7 8 9 10 11 12
STORAGE STATE E
LIFE
BUFFER INDEX
16 0 4 10 8 5 2 7 12 1 6 3
1 2 3 4 5 6 7 8 9 10 11 12

STORAGE STATE A
LIFE
BUFFER INDEX
0 4 8 ② 12 ① 6 ③ 16 5 10 7
1 2 3 ④ 5 ⑥ 7 ⑧ 9 10 11 12
STORAGE STATE B
LIFE
BUFFER INDEX
0 4 8 0 12 0 6 0 16 5 10 7
1 2 3 4 5 6 7 8 9 10 11 12
STORAGE STATE C
LIFE
BUFFER INDEX
19 3 7 0 11 0 5 0 15 4 9 6
1 2 3 4 5 6 7 8 9 10 11 12
STORAGE STATE D
LIFE
BUFFER INDEX
18 2 6 0 10 7 4 0 14 3 8 5
1 2 3 4 5 6 7 8 9 10 11 12
STORAGE STATE E
LIFE
BUFFER INDEX
17 1 5 11 9 6 3 0 13 2 7 4
1 2 3 4 5 6 7 8 9 10 11 12

STORAGE STATE A
LIFE
BUFFER INDEX
19
1 (ON)
15
2
11
3
17
4
7
5
18
6
11
7 (ON)
16
8
3
9
14
10
9
11
12
12
(19)
STORAGE STATE B
LIFE
BUFFER INDEX
19
1 (ON)
16
2
12
3
18
4
8
5
19
6 (ON)
0
7
17
8
4
9
15
10
10
11
13
12
(7)
STORAGE STATE C
LIFE
BUFFER INDEX
0
1
17
2
13
3
19
4 (ON)
9
5
19
6 (ON)
1
7
18
8
5
9
16
10
11
11 (ON)
14
12
(11)
STORAGE STATE D
LIFE
BUFFER INDEX
1
1
18
2
14
3
19
4 (ON)
10
5
0
6
2
7
19
8 (ON)
6
9
17
10
11
11 (ON)
15
12
(7)
STORAGE STATE E
LIFE
BUFFER INDEX
2
1
19
2 (ON)
15
3
0
4
11
5
1
6
3
7
19
8 (ON)
7
9
18
10
11
11 (ON)
16
12
(19)

IMAGE STORAGE APPARATUS HAVING CONTINUOUS-SHOOTING FUNCTION

CROSS-REFERENCE TO RELATED APPLICATIONS

This application is based upon and claims the benefit of priority from prior Japanese Patent Application No. 2007-074224, filed Mar. 22, 2007, the entire contents of which are incorporated herein by reference.

BACKGROUND OF THE INVENTION

1. Field of the Invention

The present invention relates to an image storage apparatus and an image storage method for use with a digital camera having a continuous-shooting function.

2. Description of the Related Art

Heretofore, an image capture apparatus has been proposed which is adapted to record images continuously captured in past times. Such an apparatus sequentially stores images captured at a predetermined frame rate into a buffer memory. When any trigger is occurred, a plurality of frames of image date stored in the buffer memory are all read from the buffer memory and then recorded into an image memory. Thereby, images captured in past time, earlier than the occurrence of the trigger, can be recorded in the image memory.

The buffer memory includes a first buffer and a second buffer. In storing image data into the buffer memory, newly captured image data is sequentially stored into the first buffer. When the first buffer is filled up, one out of the oldest images is copied into the second buffer and the copied oldest image is erased from the first buffer. Thereby, limited capacity of the buffer memory is allowed to store even an image captured in less recent past time. When the second buffer is also filled up, the oldest images are sequentially erased from the second buffer.

Conventionally, a storage area for newer images in the first buffer is secured by means of thinning out image data stored in the first buffer and copying image data from the first buffer into the second buffer. That is, the process of copying image data is indispensable, which might increase the processing burden on the CPU or delay other processing.

BRIEF SUMMARY OF THE INVENTION

It is an object of the present invention to provide an image storage apparatus and an image storage method capable of recording image data of even less recent past without a process of copying the image data.

According to an embodiment of the present invention, an image storage apparatus comprises:

an image capture unit configured to sequentially capture images of a subject;

a storage unit including storage areas to store the images of the subject captured by the image capture unit;

a storage controller configured to overwrite a storage area which is permitted to be overwritten with an image of the subject captured by the image capture unit;

a life setting unit configured to set a life of the storage area which is overwritten by the storage controller;

a life controller configured to change gradually the life of the storage area set by the life setting unit;

a determination unit configured to determine whether the life of the storage area changed by the life controller expires or not; and a permission unit configured to permit to overwrite a storage area when the determination unit determines that the life of the storage area expires.

According to another embodiment of the present invention, an image storage method for an image storage apparatus comprising an image capture unit configured to sequentially capture images of a subject and a storage unit including storage areas to store the images of the subject captured by the image capture unit, the method comprises:

a storage control step for overwriting a storage area which is permitted to be overwritten with an image of the subject captured by the image capture unit;

a life setting step for setting a life of the storage area which is overwritten by the storage control step;

a life control step for changing gradually the life of the storage area which is set by the life setting step;

a determination step for determining whether the life of the storage area changed by the life control step expires or not; and a permission step for permitting to overwrite a storage area when the determination step determines that the life of the storage area expires.

According to a still another embodiment of the present invention, a computer readable storage medium stores an image storage control program for functioning a computer as following means, the computer being included in an image storage apparatus comprising an image capture unit configured to sequentially capture images of a subject and a storage unit including storage areas to store the images of the subject captured by the image capture unit:

storage control means for overwriting a storage area which is permitted to be overwritten with an image of the subject captured by the image capture unit;

life setting means for setting a life of the storage area which is overwritten by the storage control means;

life control means for changing gradually the life of the storage area which is set by the life setting means;

determination means for determining whether the life of the storage area changed by the life control means expires or not; and permission means for permitting to overwrite a storage area when the determination means determines that the life of the storage area expires.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

The embodiments of the present invention will be described hereinafter with reference to the accompanying drawings.

First Embodiment

Figure 1:
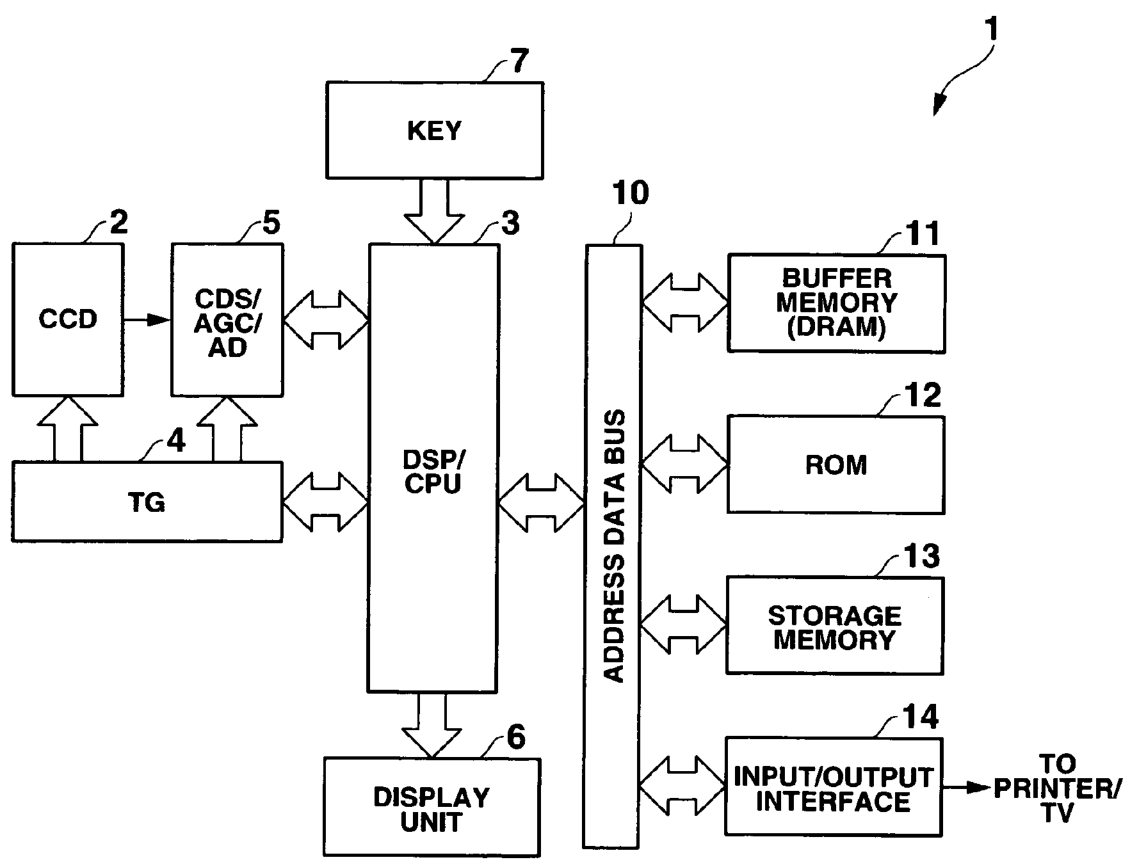
FIG. 1 is a block diagram of a digital camera according to an embodiment of the present invention.

FIG. 1 is a block diagram of a digital camera 1, which is common to embodiments of the present invention. The digital camera 1 has a still image capture function and a continuous-shooting (moving image capture) function. The digital camera 1 is equipped with a CCD 2 and a DSP/CPU 3. A photo detector of the CCD 2 is equipped with a primary-color filter with Bayer pattern. The DSP/CPU 3 has various digital signal processing functions including compression and decompression of image data. The DSP/CPU 3 is implemented in the form of a one-chip microcomputer, which controls components of the digital camera 1.

Connected to the DSP/CPU 3 is a timing generator (TG) 4 to drive the CCD 2 at a predetermined frame rate. Also connected to the TG 4 is a unit circuit 5 which receives an analog image signal corresponding to an optical image of a subject output from the CCD 2. The unit circuit 5 includes a correlation double sampling (CDS) circuit to reduce driving noise of the CCD 2 contained in the image signal output from the CCD 2, an automatic gain control (AGC) circuit to control the gain of the noise-reduced signal, and an analog-to-digital (A/D) converter which converts the signal subjected to the gain-control into a digital signal. Thus, the unit circuit 5 converts the analog image signal output from the CCD 2 into a digital image signal and sends the resulting digital Bayer data to the DSP/CPU 3.

A display unit 6 and a key entry unit 7 are connected to the DSP/CPU 3. Also a buffer memory (DRAM) 11, a ROM 12, a storage memory 13, and an input/output interface 14 are connected to the DSP/CPU 3 via an address/data bus 10. The buffer memory 11 is used as a buffer to temporarily store Bayer data and the like, and is also used as a working memory of the DSP/CPU 3.

The DSP/CPU 3 performs a pedestal clamp process on the Bayer data from the unit circuit 5, converts the Bayer data into RGB data and then further converts the RGB data into a brightness (Y) signal and color difference (UV) signals. A frame of YUV data converted by the DSP/CPU 3 is stored into the buffer memory 11. The frame of YUV data stored in the buffer memory 11 is sent to the display unit 6, where the YUV data is converted into a video signal and displayed as a through image.

In the still image capture mode, upon detection of an operation of the shutter key by the user, a still image capture process is started by switching the CCD 2 and the unit circuit 5 to the driving mode and the drive timing adapted for still image capture, which are different from a driving mode and drive timing for though-image capture. By the still image capture process, one frame of YUV data stored in the buffer memory 11 is subjected to data compression such as JPEG compression or the like and coded in the DSP/CPU 3, and then formed into a file format within the buffer memory 11. The file of YUV data is then stored in the storage memory 13 as still image data (still image file) through the address/data bus 10.

In the normal continuous shooting (moving image capture) mode, upon detection of a first operation of the shutter key by the user to command the commencement of continuous shooting, a continuous shooting process is started whereby multiple frames of YUV data are stored into the buffer memory 11 until a second operation of the shutter key is made by the user to command termination of the continuous shooting. In the past capture mode, setting of the mode is accompanied by a start of a continuous shooting (moving image capture) process, whereby multiple frames of YUV data are stored into the buffer memory 11 until the user operates the shutter key to give a command to terminate the continuous shooting.

The multiple frames of YUV data stored in the buffer memory 11 are sequentially transmitted to the DSP/CPU 3 where the YUV data is compressed using JPEG compression or the like (in the case of moving image capture, a predetermined MPEG codec is used) and then coded. The compressed and coded YUV data is converted into frame data through the buffer memory 11 and the address data bus 10, and then written into the storage memory 13 with a file name. To reproduce a still image or continuously captured images (a moving image), the DSP/CPU 3 decompresses data of the still image or continuously captured images (moving image) read from the storage memory 13 and expands the data into the image data working area within the buffer memory 11 as a still image or a frame data of the continuously captured images (moving image).

The display unit 6 includes a color LCD and associated driving circuitry. The display unit 6 displays an image of a subject captured by the CCD 2 as a through image in a wait state for shooting, and when reproducing a stored image, displays the stored image read from the storage memory 13 and subjected to decompression. The key entry unit 7 includes a plurality of operating keys, such as a shutter key, a mode setting key and a power key, and outputs a key entry signal corresponding to a key operated by the user to the DSP/CPU 3. The shutter key also functions as a continuous-shooting initiation/termination button in a continuous shooting mode, and functions as a continuous shooting termination button in the past capture mode.

The ROM 12 stores program AE data which constitutes a program chart representing combinations of shutter speeds and aperture values (F) corresponding to proper exposure values (EV) for still image capture, continuous image capture, and through image capture. The ROM 12 also stores an EV table. A charge storage time set by the DSP/CPU 3 based on a shutter speed, which is set in accordance with the program chart, is given in the form of a shutter pulse to the CCD 2 through the TG 4. The CCD 2 operates accordingly to control the charge storage time, i.e., exposure time. Thus, the CCD 2 functions as an electronic shutter. Furthermore, the ROM 12 stores programs indicated by flowcharts to be described later as well as various programs required to provide functions as a digital camera.

The digital camera 1 is equipped with the input/output interface 14, which allows for connection to external equipment such as a printer, a personal computer, a TV receiver, etc.

The buffer memory 11 is provided with twelve frame buffers indexed from 1 through 12. The frame buffers are storage areas to respectively store frames of image data which are produced at a frame rate of 4 f/s (frames per second) in the past capture mode.

Next, the operation in the present embodiment according to the above configuration will be described with reference to a flowchart illustrated in FIG. 3.

The symbols shown in the flowchart represents the following items:

N_BUFFER: the number of frame buffers;

In this embodiment, N_BUFFER is set to 12, that is, the number of provided frame buffers is twelve as mentioned above.

LIFE[I]: "frame life" of frame buffer indexed by I;

LIFE[I] indicates a numeral corresponding to a until it is determined that the frame buffer indexed by I is empty. The value of LIFE[I] ranges from 19 to 0. When the value of LIFE[I] becomes zero, the frame buffer indexed by I is considered to be "empty."

EMPTY: index of "empty" frame buffer;

The value of EMPTY indicates an index of a frame buffer considered to be empty. That is, when LIFE[I] is zero and the frame buffer I is considered to be empty, the value of EMPTY is set to I. Therefore, the value of EMPTY takes one of 1 through 12.

N_STAMP: the number of initial values of "life";

The value of N_STAMP indicates how many types of initial life the frame buffers can take. In the present embodiment, the value of N_STAMP is fixed to 4.

STAMP[STP_NUM]: initial life of frame buffer;

STAMP[STP_NUM] indicates an initial life to be set for a frame buffer. STAMP[STP_NUM] repeatedly takes 19, 7, 11, 7, and so on. STAMP[1] is 19, when the value of STP_NUM is 1 (first type of initial life). Also, STAMP[2]=7 (second type of initial life), STAMP[3]=11 (third type of initial life) and STAMP[4]=7 (fourth type of initial life).

STP_NUM: index of initial life type;

Since the value of N_STAMP is fixed to 4 in the present embodiment, STP_NUM ranges from 1 to 4.

When the mode setting key in the key entry unit 7 is operated to set the past capture mode, the DSP/CPU 3 controls the TG 4 to drive the CCD 2 at a frame rate of 4 f/s and carries out processing as indicated in the flowchart in accordance with the above program. Steps S101 to S104 represent parameter initialization processing, steps S108 to S111 represent life setting processing, and steps S113 to S116 represent life update processing.

That is, to perform the parameter initialization processing in steps S101 to S104, the counter I is initialized to 1 (step S101). Next, it is determined whether or not the value of the counter I is equal to or less than N_BUFFER (=12, in the present embodiment) (step S102). If I≦N_BUFFER ("YES" in step S102), then LIFE[I] of the frame buffer I, where I is indicated by the value of the counter I, is set to the initial value of zero (step S103). Subsequently, the counter I is incremented by one (step S104) and the processing from step S102 is repeated. In this embodiment, therefore, steps S102 to S104 are repeated twelve times with the result that the lives of the frame buffers indexed by 1 through 12 shown in FIG. 2 are all set to zero.

When the counter I reaches 13, the determination result of "I≦N_Buffer" in step S102 becomes "NO" and thus the flow goes from step S102 to step S105. The index STP_NUM of the initial life type is initialized to 1 (step S105). Next, empty frame searching and overwriting processing is carried out (step S106).

Figure 4:
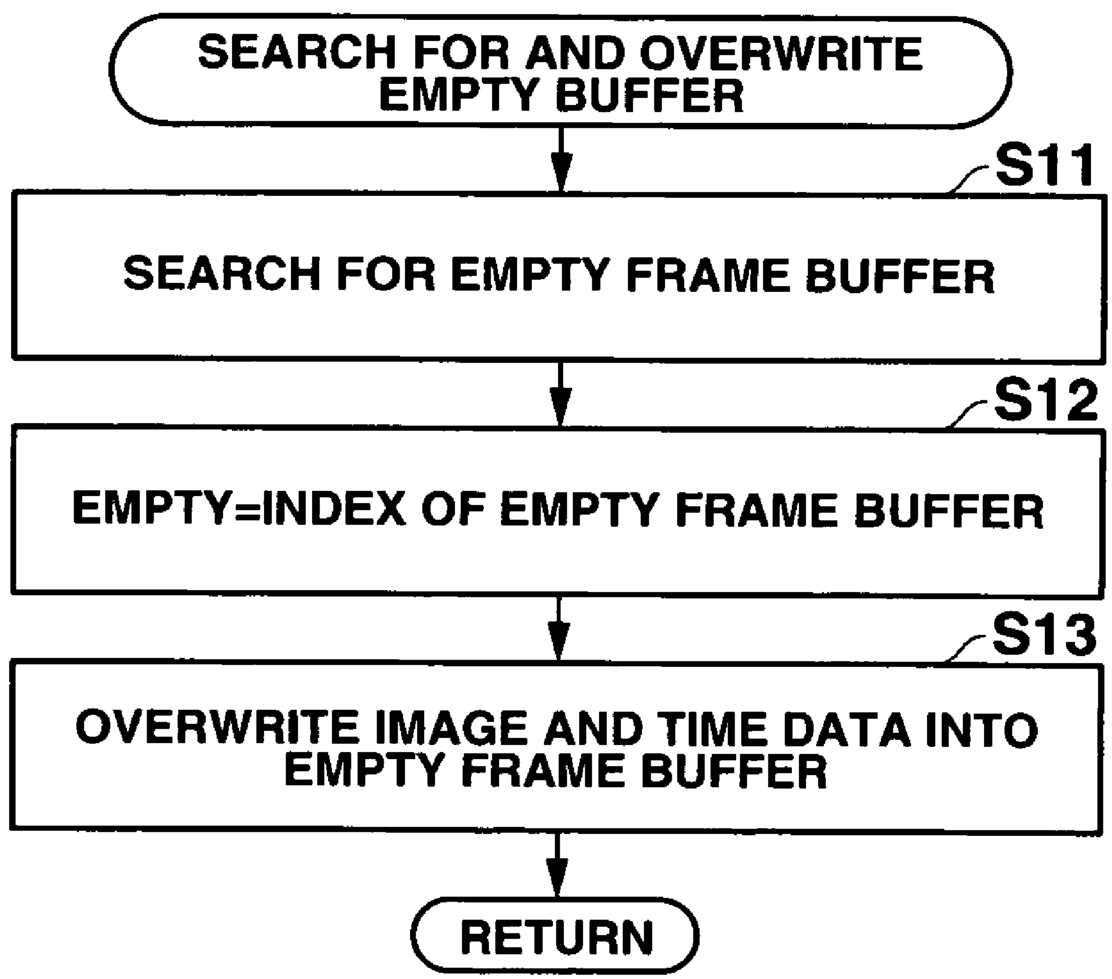
FIG. 4 is a flowchart illustrating process procedure of searching-for and writing-in an empty buffer according to the first embodiment.

The processing in step S106 is carried out in accordance with a flowchart shown in FIG. 4. The 12 frame buffers are searched for an empty frame buffer for which LIFE[I] is set to zero (step S11). The index of the found out empty frame buffer (any of 1 through 12) is stored into a register of EMPTY (step S12). When a plurality of frame buffers considered being empty are found out in step S11, one of the plurality of frame buffers is selected and the index of the selected buffer is stored into the register of EMPTY in step S12. The empty frame buffer is overwritten with a frame of image data captured by the CCD 2 and time information indicating a time of capture (step S13).

Figure 2:
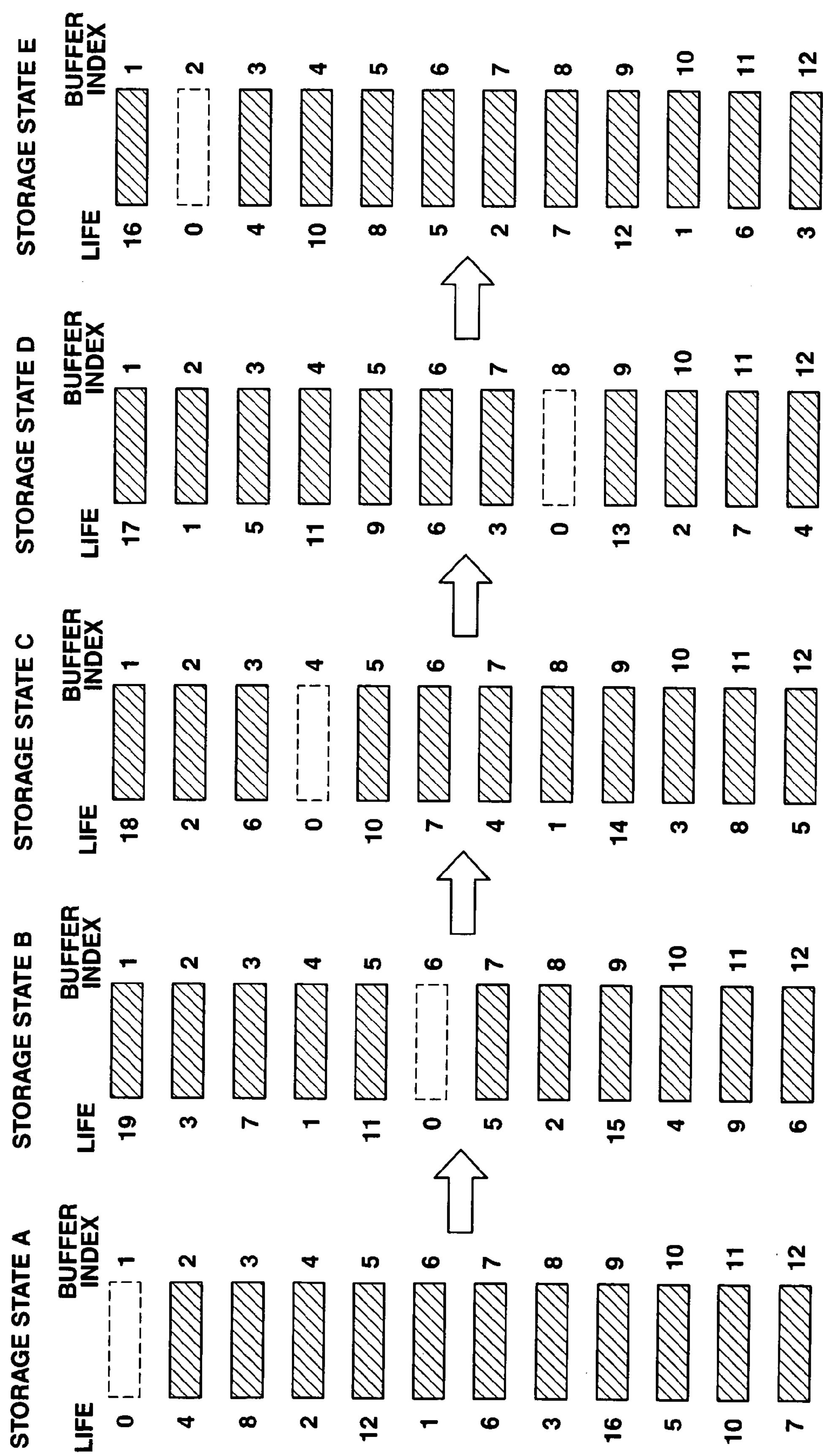
FIG. 2 is a state transition diagram of frame buffers according to a first embodiment.

Thus, in the case where the life of the frame buffer indexed by 1 is set to zero as shown in storage state A of FIG. 2, 1 is stored in EMPTY. A captured image is transferred to a frame buffer indexed by EMPTY (in this case, 1) and the buffer is overwritten with the transferred image and associated time information.

Figure 3:
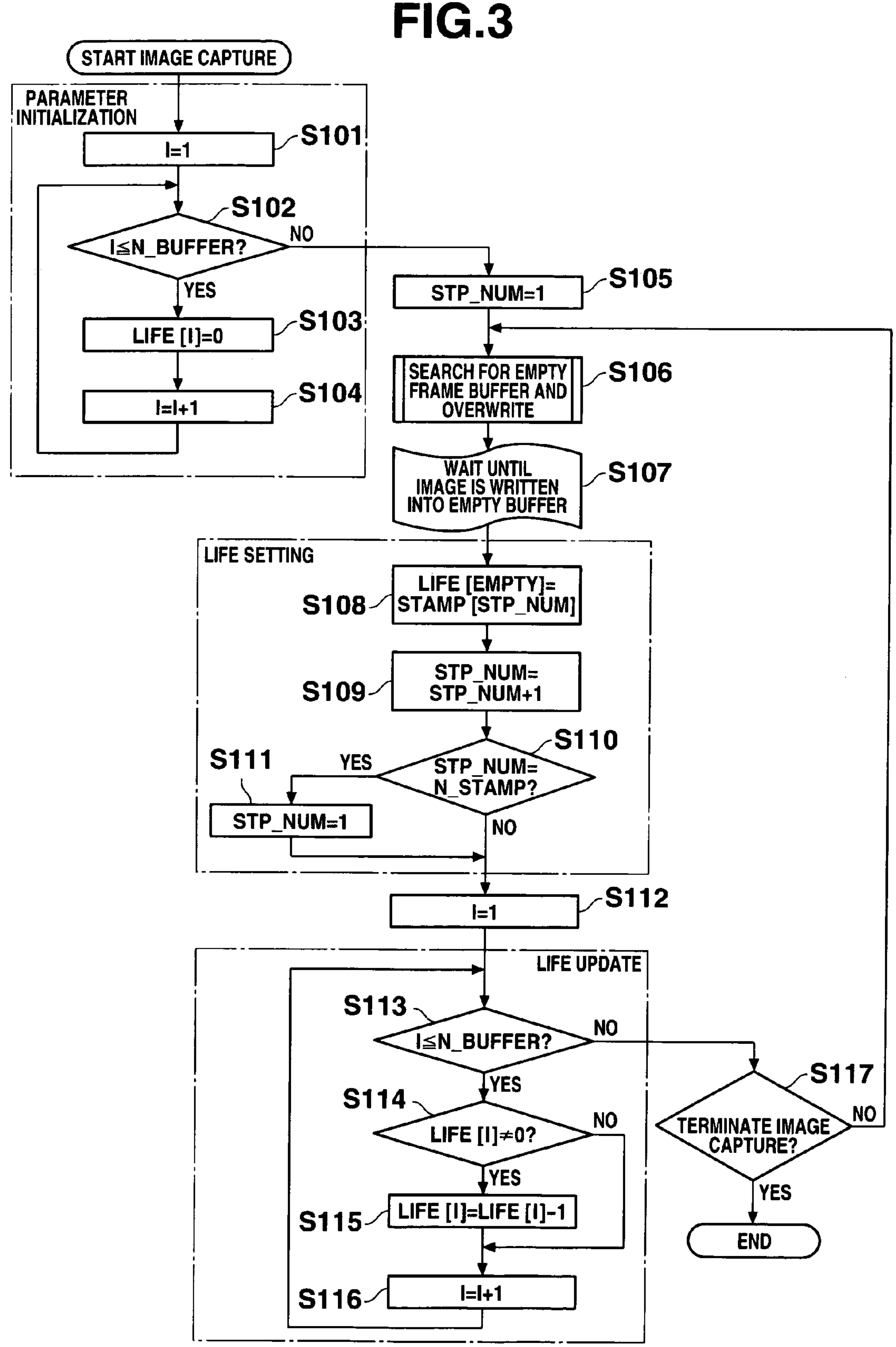
FIG. 3 is a flowchart illustrating process procedure of the first embodiment.

In step S107 of the flowchart of FIG. 3, completion of overwriting one frame of image data and associated time information in accordance with the flowchart of FIG. 4 is waited. In the present embodiment, when the past capture mode is being set, the DSP/CPU 3 controls the TG 4 to drive the CCD 2 at the frame rate of 4 f/s as described above. Therefore, a waiting time of ¼ second is required to transfer the image to the frame buffer indexed by EMPTY and to overwrite the buffer with the transferred image. When the overwrite is completed, the flow goes from step S107 to S108 to initiate the life setting processing.

To set the lives of the frame buffers, first, the life of the frame buffer LIFE[EMPTY] indicated by the value of EMPTY is set with the initial life STAMP[STP_NUM] of frame buffer which is indicated by the index STP_NUM of the type of the initial life (step S108). Since the life type index STP_NUM is set to 1 in step S105 (STP_NUM=1), the initial life STAMP[STP_NUM] is STAMP[1]. The first of four types of initial lives (19, 7, 11 and 7) is 19, therefore STAMP[1]=19. Accordingly, LIFE[1] of the frame buffer indexed by 1 is set to 19 as shown in storage state B of FIG. 2, in step S108.

Next, the index STP_NUM of the initial life type is incremented by one (step S109). It is determined whether or not the incremented index STP_NUM has reached the number of initial life types N_STAMP (=4, in the present embodiment) (step S110). If No, the flow goes to step S112 without performing step S111. If Yes, the index of the initial life type STP_NUM is initialized to 1 (step S111) and then the flow goes to step S112.

Thus, the index STP_NUM changes from 1 through N_STAMP, i.e., from 1 through 4. In the case in which the processing of S108 has been repeatedly executed, the initial life STAMP[STP_NUM] of the (empty) frame buffer, which stores new image, is set as follows: STAMP[1]=19 when the index of the initial life type STP_NUM is set to 1; STAMP[2]=7 when STP_NUM is set to 2; STAMP[3]=11 when STP_NUM is set to 3; and STAMP[4]=7 when STP_NUM is set to 4.

Therefore, in the case where the life of the frame buffer indexed by 1 is zero and the frame buffer indexed by 1 is considered to be empty (EMPTY=1) as shown in the storage state A of FIG. 2, when STP_NUM is 1, the processing in step S108 leads to LIFE[1]=STAMP[STP_NUM]=STAMP[1]=19. Accordingly, the life of the frame buffer indexed by 1 is set to 19, which is the value of STAMP[1], as shown in the storage state B of FIG. 2.

In the case where the life of the frame buffer indexed by 6 is zero (EMPTY=6) as shown in the storage state B of FIG. 2, when STP_NUM is 2, the processing in step S108 results in LIFE[6]=STAMP[STP_NUM]=STAMP[2]=7. Accordingly, the life of the frame buffer indexed by 6 is set to 7, which is the value of STAMP[2], as shown in the storage state C of FIG. 2.

As shown in the storage state C of FIG. 2, in the case where the life of the frame buffer indexed by 4 is zero (EMPTY=4), when STP_NUM=3, the processing of step S108 results in LIFE[4]=STAMP[STP_NUM]=STAMP[3]=11. Thus, as shown in the storage state D of FIG. 2, the life of the frame buffer 4 comes to be 11, which is the value of STAMP[3].

As shown in the storage state D of FIG. 2, in the case where the life of the frame buffer indexed by 8 is zero (EMPTY=8), when STP_NUM=4, the processing of step S108 results in LIFE[8]=STAMP[STP_NUM]=STAMP[4]=7. Thus, as shown in the storage state E of FIG. 2, the life of the frame buffer 8 is set to 7, which is the value of STAMP[4].

In step S112 subsequent to step S110 or step S111, the counter I is initialized to 1 and the life update processing in steps S113 to S116 is executed. In the life update processing, it is firstly determined whether or not the value of the counter I is equal to or less than N_BUFFER (=12, in the present embodiment) (step S113). If I≦N_BUFFER ("YES" in step S113), then it is determined whether LIFE[I] of the frame buffer I indicated by the value of the counter I is non-zero (step S114). When the life of the frame buffer I is zero ("NO" in step S114), the flow goes to step S116 without performing step S115.

When the life of the frame buffer I (LIFE[I]) is non-zero ("YES" in step S114), then LIFE[I] is decremented by one (step S115). Next, the counter I is incremented (step S116), and the flow is repeatedly executed from step S113. In the present embodiment, therefore, steps S113 to S116 are repeated twelve times in succession with the result that the life of each frame buffer having non-zero value is decremented by one.

When the counter I reaches 13, the determination result of step S113 becomes "NO" and consequently the flow goes from step S113 to S117, where it is determined whether or not a command is given to terminate image capture (step S117). In the absence of such a command ("NO" in step S117), the flow returns to step S106. Thus, the life setting processing in steps S108 to S111 and the life update processing in steps S113 to S116 are repeated until a command is given to terminate image capture.

By repeating the life setting processing in steps S108 to S111, empty buffers are overwritten with recent images and initial lives of the empty buffers are set, as described above. By repeating the life update processing in steps S113 to S116, the life of the frame buffer indexed by 2 in FIG. 2 is decremented from 4 through 3, 2 and 1 to zero, for example.

When the shutter key is operated to give a command to terminate image capture, the processing according to the above flowcharts is terminated. Accordingly, when a command is given to terminate image capture in the storage state E of FIG. 2, for example, the processing is terminated in a state where the twelve frame buffers have been respectively storing images and associated time information. That is, since the process carried out in step S13 of FIG. 4 is an overwrite process; an image is stored in the frame buffer 2 having the life of zero. A total of twelve images and associated time information are respectively stored in all of the twelve frame buffers including the frame buffer indexed by 2.

In the present embodiment, image capture is carried out at a frame rate of 4 fps and the number of frame buffers is 12. Therefore, if older images were sequentially erased and newer images were sequentially stored, only past images captured up to three seconds before could be stored. According to the present embodiment, however, the decrement of life and overwrite are repeatedly executed at every ¼ second from maximal initial life of 19 to zero; therefore, past images captured up to 4.75 seconds before can be stored.

Consequently, according to the present embodiment, it is possible to store even image data captured less recent past, without a process of copying image data.

Moreover, the straightforward process of decrementing the life set up for each frame buffer allows even image data of the less recent past to be stored with no need to copy the image data.

Decrementing a life of a frame buffer allows determining that, when the life reaches zero, image data in the corresponding buffer can be overwritten. Therefore, unlike a third embodiment to be described later, there is no need to use overwrite permission flags and to set up storage areas for the overwrite permission flags. Thus, even image data of the less recent past can be stored with straightforward processing and memory configuration.

Note that the time sequence of stored images is irrelevant to order of the indexes of the frame buffers. Therefore, to finally record continuously-captured image data (a moving image) consisting of the frames of image data stored in the frame buffers into the storage memory 13 with a file name appended, the frames of image data may be arranged and recorded in order of time based on time information stored for the respective frames. In such a case, it is also possible to read images only from frame buffers having lives more than a given value except a frame buffer having a life of zero to produce continuously-captured image data.

However, it is also possible to record the frames of image data into the storage memory 13 without aligning the frames in order of time. When reproducing the frames of image data, the frames of image data may be read out from the storage memory 13 in order of time based on time information stored together.

In the present embodiment, when the mode setting key in the key entry unit 7 is operated to set the past capture mode, the processing is initiated with step S101 and completed when a command is given to terminate the image capture ("YES" in step S117). However, it is also possible to initiate the processing in response to half-depression of the shutter key and terminate the processing in response to full depression of the shutter key.

Second Embodiment

Figure 5:
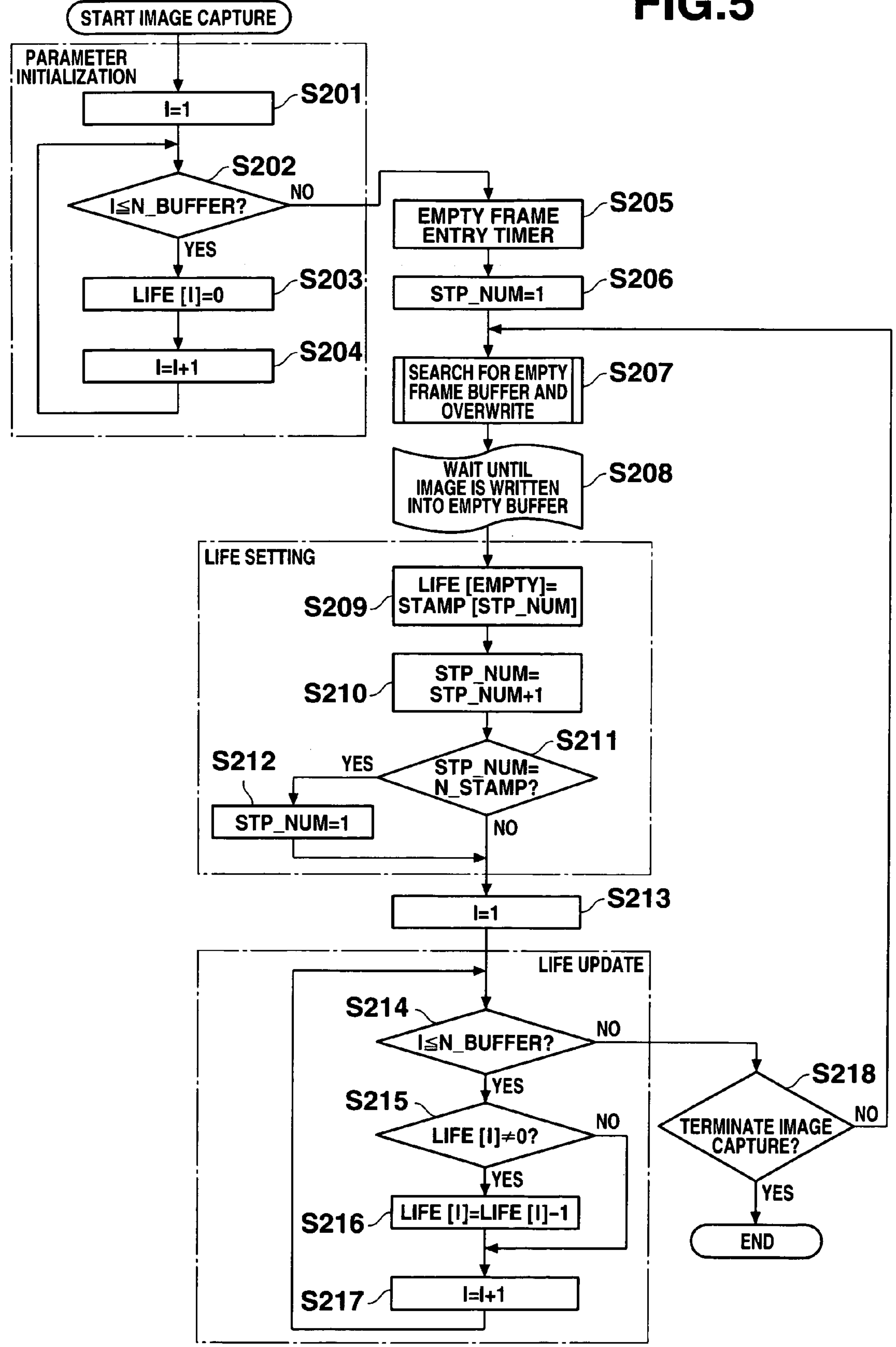
FIG. 5 is a flowchart illustrating process procedure of a second embodiment.
Figure 6:
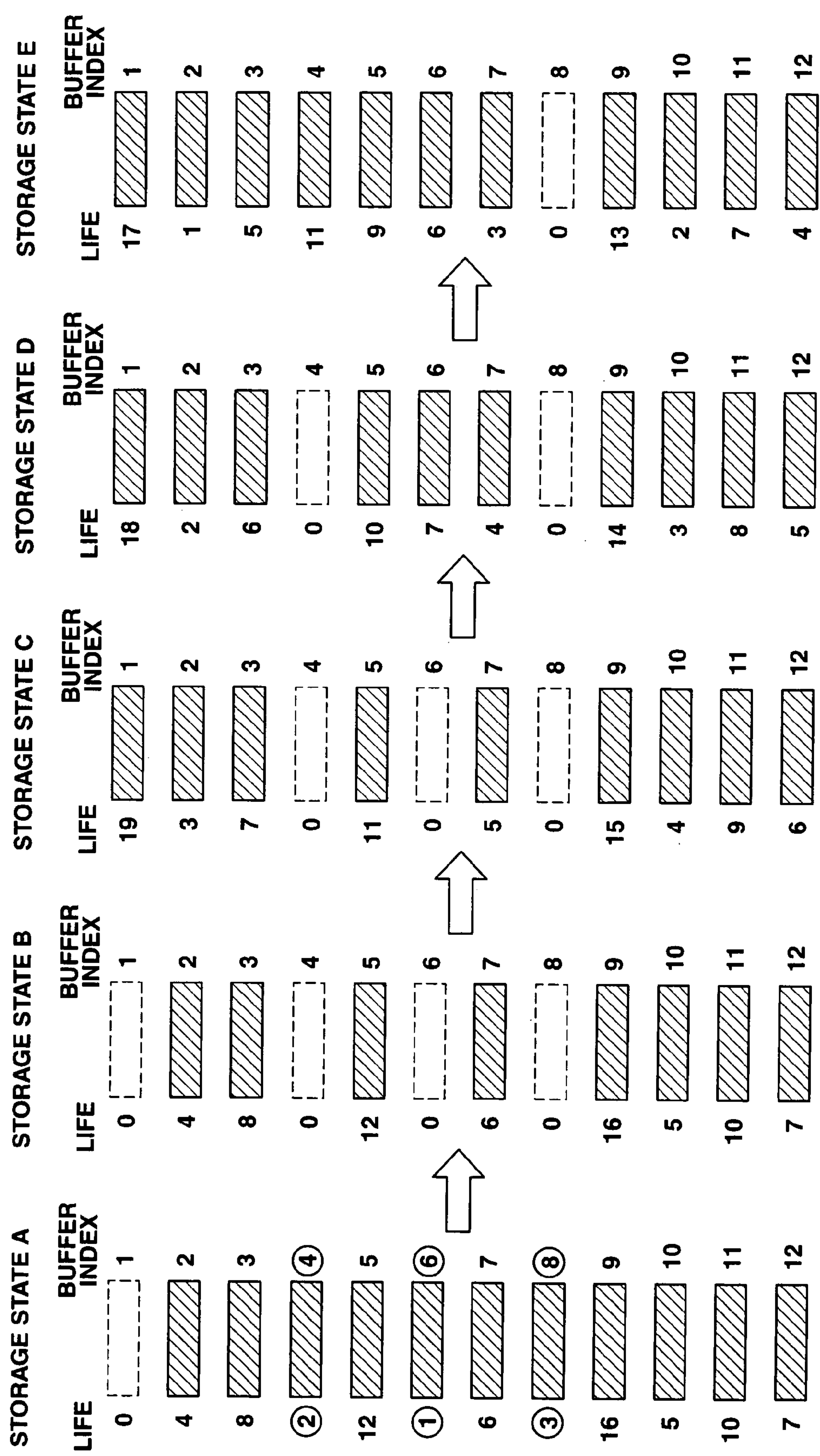
FIGS. 6 and 7 form a state transition diagram of frame buffers in the second embodiment.

FIG. 5 is a flowchart illustrating process procedure of a second embodiment of the present invention. The symbols used in this flowchart are equivalent to those in the flowchart of the first embodiment shown in FIG. 3. The parameter initialization processing of steps S201 to S204 is identical to the processing of steps S101 to S104 in the first embodiment. Thus, the frame buffers indexed by 1 through 12 in FIG. 6 are all initialized to zero.

When the value of the counter I reaches 13, the determination of whether or not "I≦N BUFFER" in step S202 results in "NO" and consequently the flow goes from step S202 to step S205 to start an empty frame entry timer. The empty frame entry timer is a timer which repeats timeout and reset at regular intervals set by the user with the key entry unit 7.

Next, the index STP_NUM of the initial life type is initialized to 1 (step S206), and then empty frame searching and overwriting processing is carried out (step S207).

Figure 8:
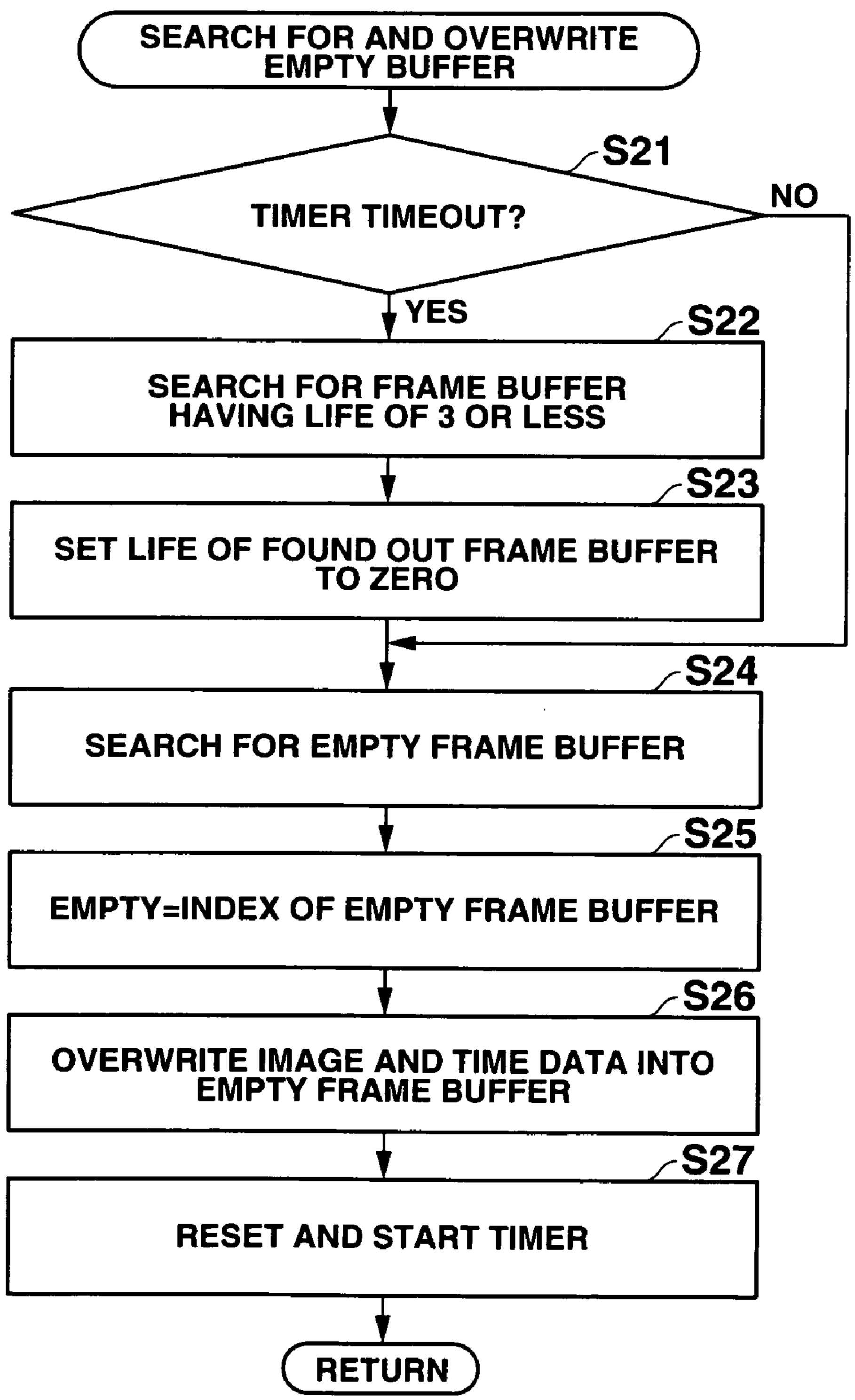
FIG. 8 is a flowchart illustrating process procedure of searching-for and writing-in an empty buffer according to the second embodiment.

The processing in step S207 is carried out in accordance with a flowchart shown in FIG. 8. It is determined whether or not a timeout has occurred and a specified time for the empty frame entry timer has elapsed. When the specified time has not elapsed, the determination result of step S21 becomes "NO". In this case, the flow goes to step S24 without performing steps S22 and S23.

When the specified time is reached ("YES" in step S21), a search is made for a frame buffer having a life which is not greater than 3 except a frame buffer having a life of zero (step S22). Therefore, when step S22 is carried out in the storage state A of FIG. 6, as indicated by circled numbers, the frame buffer indexed by 4 whose life is 2, the frame buffer indexed by 6 whose life is 1 and the frame buffer indexed by 8 whose life is 3 will be found out. Furthermore, the lives of these frame buffers are set to zero (step S23). As a result, the lives of the frame buffers indexed by 4, 6 and 8 are set to zero as shown in the storage state B of FIG. 6.

In step S24 subsequent to step S21 or step S23, a search is made for an empty frame buffer for which LIFE[I] is set to zero (step S24). The index of the found out empty frame buffer (indexed by any one of 1, 4, 6 and 8, in the above example) is stored into a register of EMPTY (step S25). Then, the empty frame buffer is overwritten with an image captured by the CCD 2 and time information indicating a time of capture (step S26).

Thus, when the lives of the frame buffers indexed by 1, 4, 6 and 8 are set to zero as shown in the storage state B of FIG. 6, EMPTY stores the index of 1, for example. A frame of image data is transferred to a frame buffer indexed by EMPTY and the buffer is overwritten with the transferred image data and associated time information. In addition, the empty frame entry timer is reset and then started (step S27).

In step S208 of the flowchart of FIG. 5, completion of overwriting one frame of image data and associated time information in accordance with the flowchart of FIG. 8 is waited. As described above, this embodiment is configured such that, when the past capture mode is set, the DSP/CPU 3 controls the TG 4 to drive the CCD 2 at a frame rate of 4 f/s. Therefore, a waiting time of ¼ second is required to transfer the image to the frame buffer indexed by EMPTY and to overwrite the buffer with the transferred image. When the image is fully written into the buffer, the flow goes from step S208 to S209 to initiate the life setting processing.

This life setting processing is identical to the processing in steps S108 to S111 in the flowchart of FIG. 3. That is, first, the life of the frame buffer (LIFE[EMPTY]) indicated by value of EMPTY is set with the initial life STAMP[STP_NUM] of frame buffer which is indicated by the index STP_NUM of the initial life type (step S209). Since the life type index STP_NUM is set to 1 (STP_NUM=1) as in step S206, the life initial life STAMP[STP_NUM] is STAMP[1]. The first of the four types of initial lives (19, 7, 11 and 7) is 19, and thus STAMP[1]=19. Therefore, in step S209, LIFE[1] of the frame buffer indexed by 1 is set to 19 as shown in the storage state C of FIG. 6.

Next, the index of the initial life type STP_NUM is incremented (step S210) and it is then determined whether or not the incremented index STP_NUM has reached the number of the types of initial lives N_STAMP (=4, in the present embodiment) (step S211). If No, the flow goes to step S213 without performing step S212. If Yes, the index STP_NUM is initialized to 1 (step S212) and then the flow goes to step S213.

Thus, the index STP_NUM changes from 1 through N_STAMP, i.e., from 1 through 4. In the case in which the processing of S209 has been repeatedly executed, the initial life STAMP[STP_NUM] of the (empty) frame buffer, which stores new image, is set as follows: STAMP[1]=19 when the index of the initial life type STP_NUM is set to 1; STAMP[2]=7 when STP_NUM is set to 2; STAMP[3]=11 when STP_NUM is set to 3; and STAMP[4]=7 when STP_NUM is set to 4.

Therefore, as shown in the storage state B of FIG. 6, in the case where the life of the frame buffer indexed by 1 is zero and the frame buffer indexed by 1 is considered to be empty (EMPTY=1), when STP_NUM=1, the processing in step S209 leads to LIFE[1]=STAMP[STP_NUM]=STAMP[1]=19. Thus, as shown in the storage state C of FIG. 6, the life of the frame buffer indexed by 1 is set to 19, which is the value of STAMP[1].

As shown in the storage state C of FIG. 6, in the case where the life of the frame buffer indexed by 6 is zero (EMPTY=6), when STP_NUM=2, the processing in step S209 leads to LIFE[6]=STAMP[STP_NUM]=STAMP[2]=7. Thus, as shown in the storage state D of FIG. 6, the life of the frame buffer 6 is set to 7, which is the value of STAMP[2].

As shown in the storage state D of FIG. 6, in the case where the life of the frame buffer indexed by 4 is zero (EMPTY=4), when STP_NUM=3, the processing in step S209 leads to LIFE[4]=STAMP[STP_NUM]=STAMP[3]=11. Thus, as shown in the storage state E of FIG. 6, the life of the frame buffer 4 is set to 11, which is the value of STAMP[3].

Figure 7:
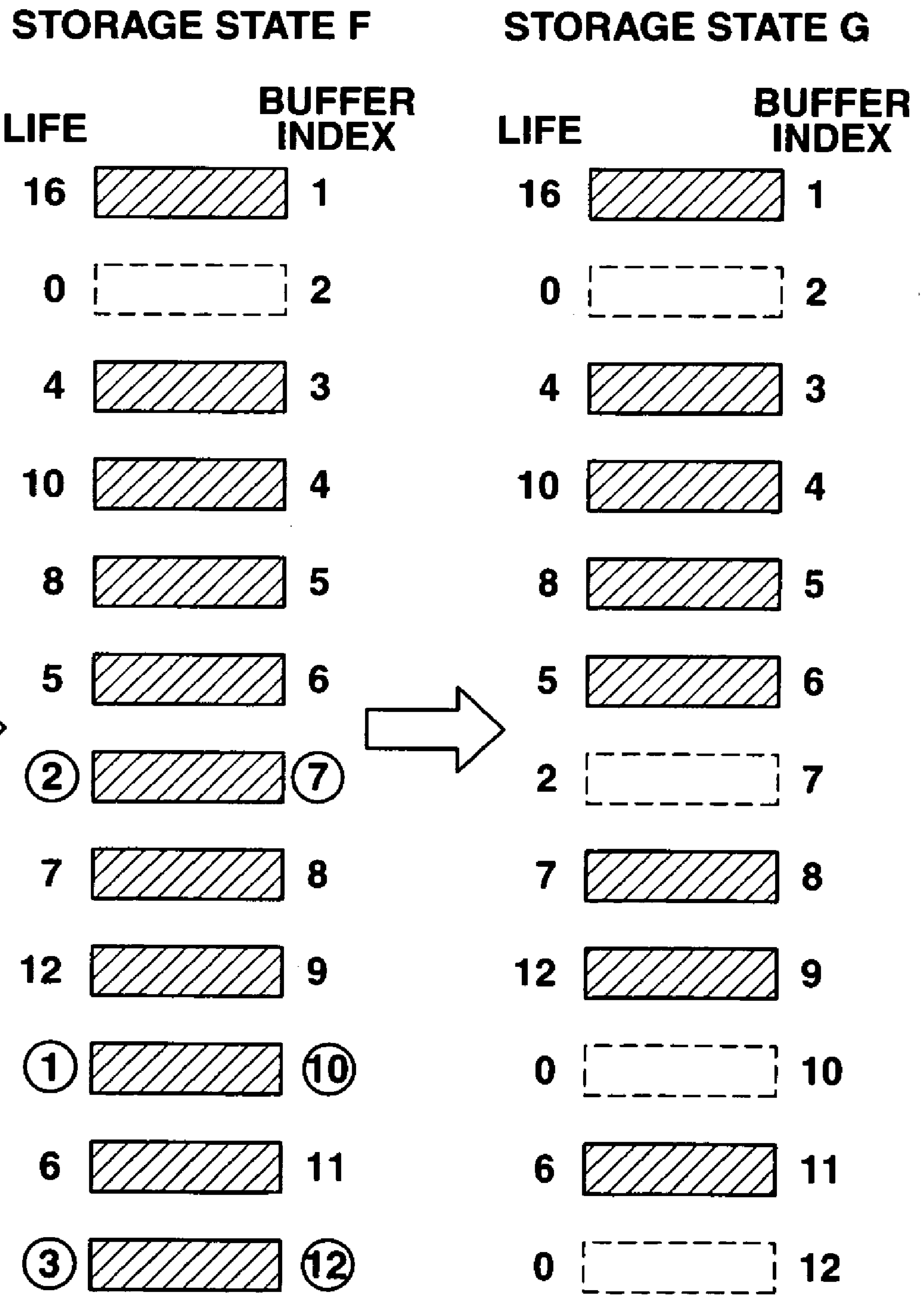

As shown in the storage state E of FIG. 6, in the case where the life of the frame buffer indexed by 8 is zero (EMPTY=8), when STP_NUM=4, the processing in step S209 results in LIFE[8]=STAMP[STP_NUM]=STAMP[4]=7. Thus, as shown in the storage state F of FIG. 7, the life of the frame buffer 8 is set to 7, which is the value of STAMP[4].

In step S213 subsequent to step S211 or S212, the counter I is initialized to 1 to carry out the life update processing in steps S214 to S217. In the life update processing, it is firstly determined whether or not the value of the counter I is equal to or less than N_BUFFER (=12, in the present embodiment) (step S214). If I≦N BUFFER ("YES" in step S214), then it is determined whether or not LIFE[I] of the frame buffer indexed by the value of the counter I is non-zero (step S215). When the life of the frame buffer I is zero ("NO" in step S215), then the flow goes to step S217 without performing step S216.

When the life of the frame buffer (LIFE[I]) indexed by I is non-zero ("YES" in step S215), then the LIFE[I] is decremented by one (step S216). Next, the counter I is incremented (step S217), and the flow is repeatedly executed from step S214. In this embodiment, therefore, steps S214 to S217 are repeated twelve times in succession with the result that the life of each frame buffer having non-zero value is decremented by one.

When the counter I reaches 13, the determination result of step S214 becomes "NO" and consequently the flow goes from step S214 to S218, in which it is determined whether or not a command is given to terminate image capture (step S218). In the absence of such a command ("NO" in step S218), the flow returns to step S207. Thus, the life setting processing in steps S209 to S212 and the life update processing in steps S214 to S217 are repeated until a command is given to terminate image capture.

By repeating the life setting processing in steps S209 to S212, empty buffers are overwritten with recent images and initial lives of the empty buffers are set, as described above. By repeating the life update processing in steps S214 to S217, the life of the frame buffer indexed by 2 in FIG. 6 is decremented from 4 through 3, 2 and 1 to zero, for example.

While decrementing a life of a frame buffer, when timeout of the timer occurs, the determination result in step S21 becomes "YES". Then, a search is made for frame buffers whose life values are not greater than 3 except frame buffers whose life values has already been set to zero (step S22). In the case where step S22 is carried out in the storage state F of FIG. 7, the frame buffer 7 whose life is 2, the frame buffer 10 whose life is 1 and the frame buffer 12 whose life is 3 will be found out as indicated by circled numbers. Furthermore, the lives of these frame buffers are set to zero (step S23). As a result, the lives of the frame buffers indexed by 7, 10 and 12 are set to zero as shown in the storage state G of FIG. 7. Thereafter, the processing in steps S24 to S27 and then the processing in steps S208 to S218 are executed.

When the shutter key is operated to give a command to terminate image capture, the processing according to the above flowcharts is terminated. Accordingly, when a command is given to terminate image capture in the storage state G of FIG. 7, for example, the processing terminates in a state where the twelve frame buffers have been respectively storing twelve images and associated time information. That is, since the process carried out in step S26 of FIG. 8 is an overwrite process, images are stored even in the frame buffers indexed by 2, 7, 10 and 12 which have lives set to zero. A total of twelve images and associated time information are respectively stored in all of the twelve frame buffers.

In this embodiment, image capture is carried out at a frame rate of 4 fps and the number of frame buffers is 12. Therefore, if older images were sequentially erased and newer images were sequentially stored, only past images captured up to three seconds before could be stored. In this embodiment, however, the decrement and overwrite are repeatedly executed at every ¼ second from the maximal initial life of 19 to zero; therefore, past images captured up to 4.75 seconds before can be stored.

Consequently, according to the present embodiment, it is possible to store even image data captured less recent past, without a process of copying image data.

Moreover, according to this embodiment, since a predetermined value (in this case, “0”) indicating that a buffer is empty is compulsorily assigned at every specified time to a life or lives of frame buffer(s) decremented to less than a given value to bring the frame buffer(s) to be overwritable, it is possible to certainly secure an overwritable frame buffer in a easy manner.

Third Embodiment

Figure 9:
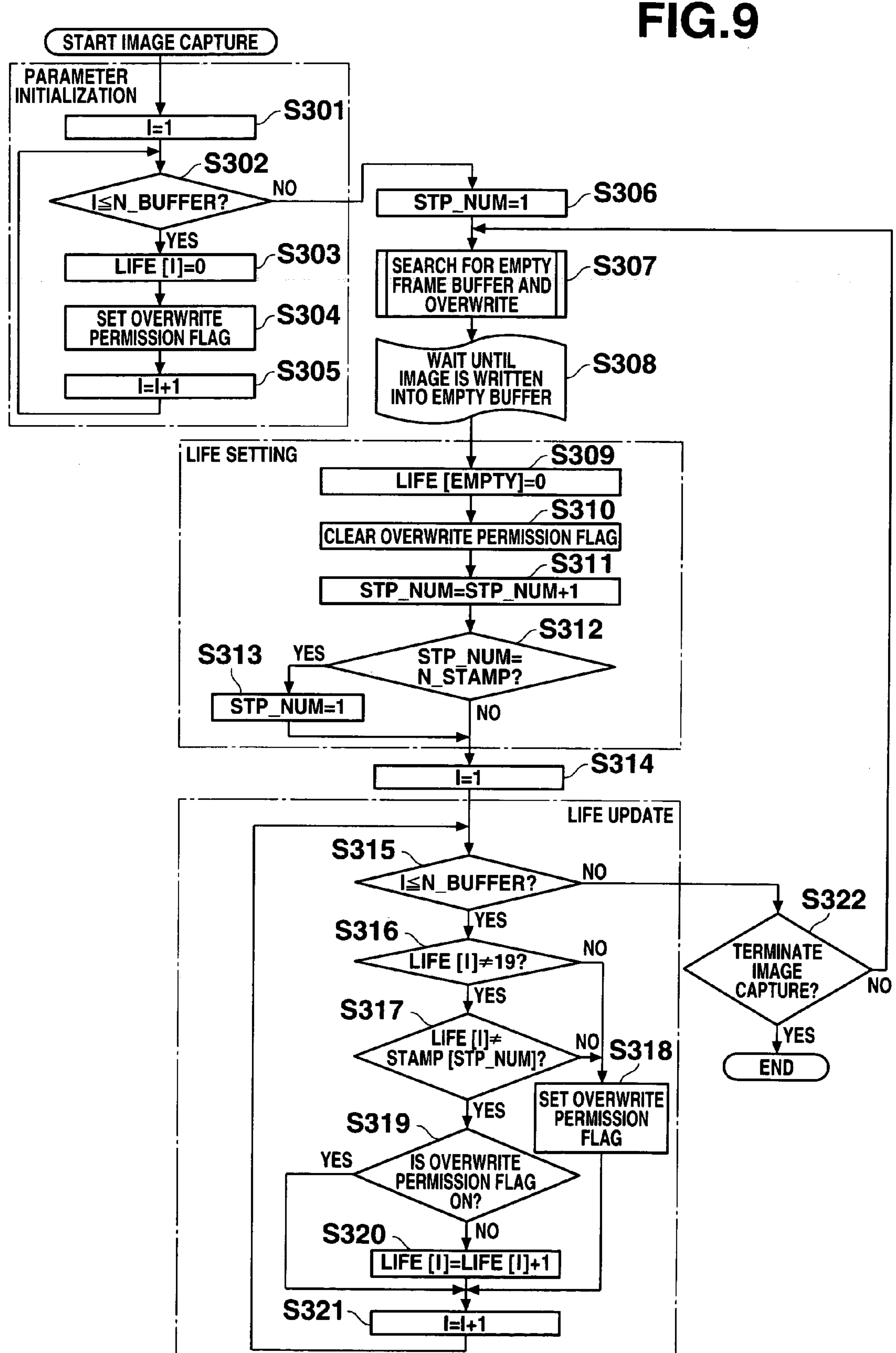
FIG. 9 is a flowchart illustrating process procedure of a third embodiment.

FIG. 9 is a flowchart illustrating process procedure according to a third embodiment of the present invention. In this embodiment, unlike the first embodiment, values of lives are incremented. Thus, the symbols used in this flowchart are not equivalent to those used in the flowchart of the first embodiment shown in FIG. 3 with respect to the following items:

LIFE[I]: life of frame buffer indexed by I

LIFE[I] indicates a numeral corresponding to a time until it is determined that the frame buffer indexed by I is empty. The value of LIFE[I] ranges from 0 to 19. Basically, when the value of LIFE[I] becomes 19, the frame buffer indexed by I is considered to be “empty.” In some cases, however, the frame buffer indexed by 11 or 7 may be considered to be empty.

N_STAMP: the number of final values of “life”;

The value of N_STAMP indicates how many types of final life the frame buffers can take. In the present embodiment, the value of N_STAMP is fixed to 4.

STP_NUM: index of final life type;

Since the value of N_STAMP is fixed to 4 in the present embodiment, STP_NUM ranges from 1 to 4.

STAMP[STP_NUM]: final life of frame buffer;

STAMP[STP_NUM] indicates a final life to be set for a frame buffer. STAMP[STP_NUM] repeatedly takes 19, 7, 11, 7, and so on. STAMP[1] is 19 (first type of final life), STAMP[2]=7 (second type of final life), STAMP[3]=11 (third type of final life) and STAMP[4]=7 (fourth type of final life).

In this embodiment, overwrite permission flags are used in addition to the above symbols. The overwrite permission flags are set up for the respective frame buffers. When a flag is on, the flag indicates overwriting the corresponding frame buffer is permitted; otherwise, when the flag is off, the flag indicates that overwriting the frame buffer is inhibited.

As shown in the flowchart, parameter initialization processing is performed in steps S301 to S305. Specifically, the counter I is initialized to 1 (step S301). Next, it is determined whether or not the value of the counter I is equal to or less than N_BUFFER (=12, in the present embodiment) (step S302). If I≦N_BUFFER (“YES” in step S302), then LIFE[I] of the frame buffer indexed by the value of the counter I is initialized to zero (step S303) and the overwrite permission flag of the frame buffer I is set (step 304). Subsequently, the counter I is incremented by one (step S305) and the processing from step S302 is repeatedly executed. In this embodiment, therefore, steps S302 to S305 are repeated twelve times with the result that the frame buffers indexed by 1 through 12 shown in FIG. 10 are all set to zero and overwrite permission flags of the buffers are on.

When the counter I reaches 13, the determination result of “I≦N BUFFER” in step S302 becomes “NO” and thus the flow goes from step S302 to S306. The index STP_NUM of the final life type is initialized to 1 (step S306). Next, empty frame searching and overwriting processing is carried out (step S307).

Figure 11:
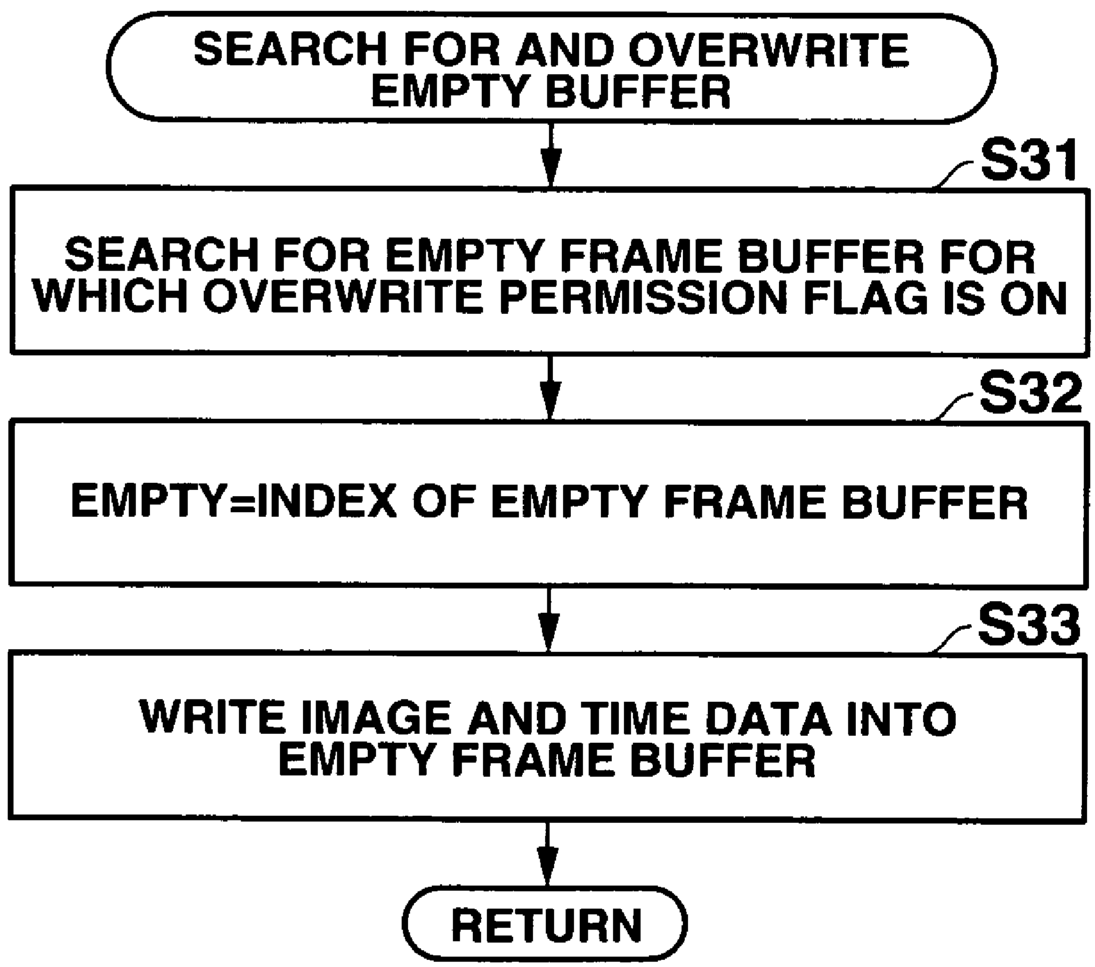
FIG. 11 is a flowchart illustrating process procedure of searching-for and writing-in an empty buffer according to the third embodiment.

The processing in step S307 is carried out in accordance with a flowchart shown in FIG. 11. The 12 frame buffers are searched for an empty frame buffer for which the overwrite permission flag is on (step S31). The index of the found out empty frame buffer (any of 1 through 12) is stored into a register of EMPTY (step S32). When a plurality of overwritable frame buffers are found out in step S31, one of the plurality of frame buffers is selected and the index of the selected buffer is stored into the register of EMPTY in step S32. The frame buffer corresponding to the index stored in EMPTY is overwritten with a frame of image data captured by the CCD 2 as well as time information indicating a time of capture (step S33).

Figure 10:
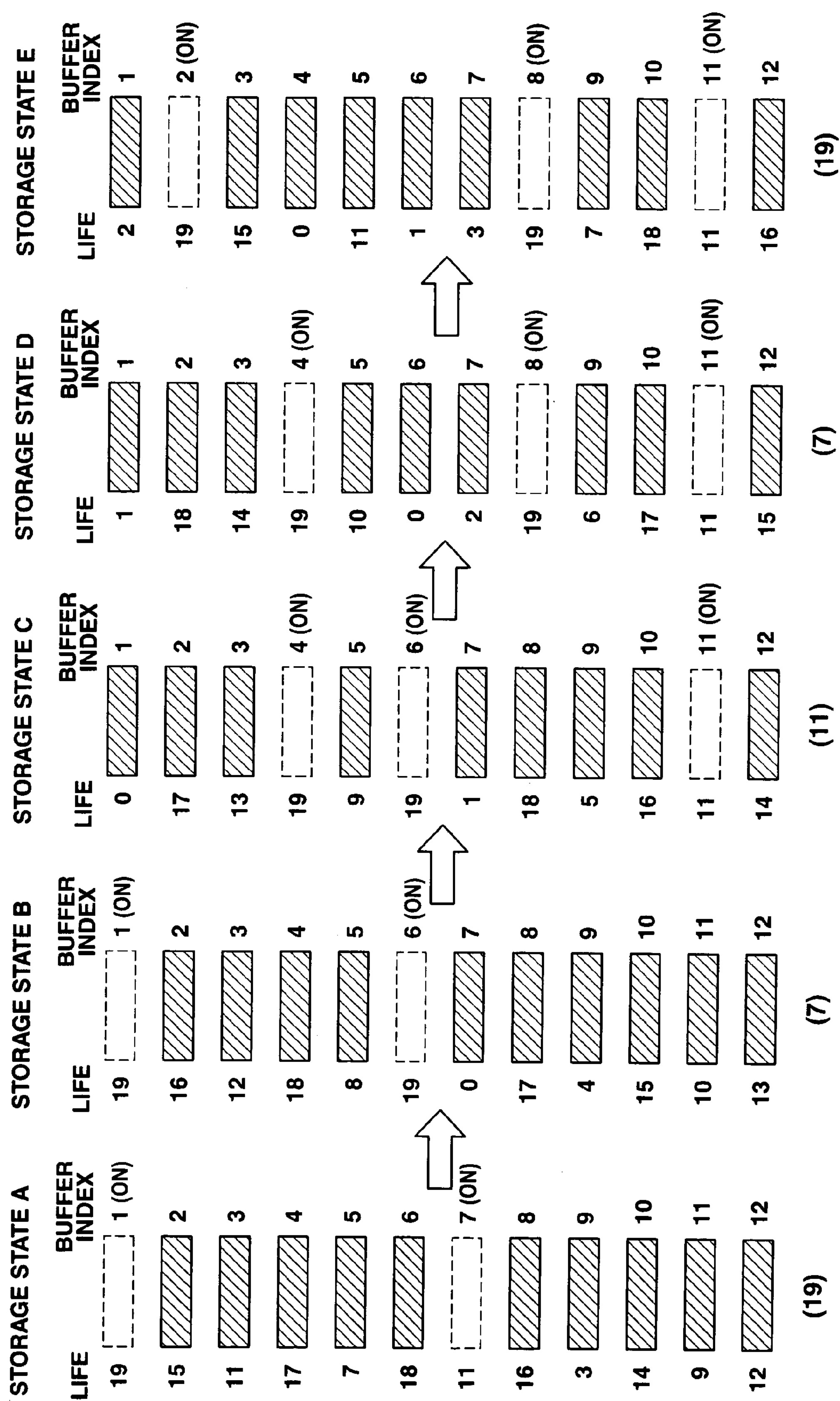
FIG. 10 is a state transition diagram of frame buffers in the third embodiment.

Thus, as shown in the storage state A of FIG. 10, in the case where overwrite permission flags of frame buffers indexed by 1 and 7 are on, EMPTY stores one of the indexes 1 and 7. By way of example, the frame buffer index 7 is selected in FIG. 10. A captured image is transferred to a frame buffer indexed by EMPTY (in this case, 7) and then the buffer indexed by 7 is overwritten with the transferred image and associated time information.

In step S308 of the flowchart of FIG. 9, completion of overwriting one frame of image data and associated time information in accordance with the flowchart of FIG. 11 is waited. In the present embodiment, when the past capture mode is being set, the DSP/CPU 3 controls the TG 4 to drive the CCD 2 at the frame rate of 4 f/s as described above. Therefore, a waiting time of ¼ second is required to transfer the image to the frame buffer indexed by EMPTY and to overwrite the buffer with the transferred image. When the buffer is fully overwritten with the transferred image, the flow goes from step S308 to S309 to initiate the life setting processing.

To set the lives of the frame buffers, first, the life LIFE [EMPTY] of the frame buffer indexed by the value of EMPTY is set to zero (step S309), and the overwrite permission flag of the frame buffer indexed by EMPTY is cleared to inhibit overwriting (step S310).

Next, the index STP_NUM of the final life type is incremented by one (step S311) and it is determined whether or not the incremented index STP_NUM has reached the number of types of final life N_STAMP (=4, in the present embodiment) (step S312). If No, the flow goes to step S314 without performing step S313. If Yes, the index STP_NUM of the final life type is initialized to 1 (step S313) and then the flow goes to step S314. Thus, the index STP_NUM of the final life type changes from 1 through N_STAMP, that is, from 1 through 4.

In step S314 subsequent to step S312 or S313, the counter I is initialized to 1 and the life update processing in steps S315 to S321 is executed. In the life update processing, it is firstly determined whether or not the value of the counter I is equal to or less than N_BUFFER (=12, in the present embodiment) (step S315). If I≦N BUFFER ("YES" in step S315), then it is determined whether LIFE[I] of the frame buffer I indicated by the value of the counter I is not 19 (step S316). When the life of the frame buffer I is 19 ("NO" in step S316), then the overwrite permission flag of the frame buffer I is set (step S318).

When the life LIFE[I] of the frame buffer I is not 19 ("YES" in step S316), then it is determined whether LIFE[I] is not equal to STAMP[STP_NUM] which is indexed by the final life type STP_NUM (step S317).

In the case where the processing of S311 has been repeatedly executed to set the final life type index STP_NUM with 1 through 4, the final life STAMP[STP_NUM] is set as follows: STAMP[1]=19 when STP_NUM is 1; STAMP[2]=7 when STP_NUM is [2]; STAMP[3]=11 when STP_NUM is 3; and STAMP[4]=7 when STP_NUM is 4.

In step S317, therefore, it is determined depending on the life type index STP_NUM which is set in step S311 whether the life LIFE[i] of the frame buffer indexed by I is not equal to 19, 7, 11 or 7. As a result of step S317, when it is determined that LIFE[I] of the frame buffer indexed by I accords with the final life of 19, 7, 11 or 7 corresponding to STP_NUM ("NO" in step S317), the overwrite permission flag of the frame buffer indexed by I is set (S318).

However, when it is determined that LIFE[I] of the frame buffer indexed by I does not accord with the final life of 19, 7, 11 or 7 corresponding to STP_NUM ("YES" in step S317), it is further determined whether or not the overwrite permission flag of the frame buffer I is on (step S319). When the overwrite permission flag of the frame buffer indexed by I is on ("YES" in step S319), then the flow goes to step S321 without executing step S320. When the overwrite permission flag of the frame buffer indexed by I is not on ("NO" in step S319), then LIFE[I] of the frame buffer indexed by I is incremented by one (step S320). Next, the counter I is incremented by one (step S321) and then the flow is repeatedly executed from step S315. In this embodiment, therefore, steps S313 to S321 are repeated twelve times in succession.

In the case where the life setting processing from step S315 to step S321 has been repeatedly executed, when the life type index STP_NUM is 1, the final life STAMP[1] is 19, as shown in the storage state A of FIG. 10. Since the life of the frame buffer indexed by I becomes 19 as shown in the storage state A of FIG. 10, the determination result of step S316 is "NO." Processing in step S318 allows the overwrite permission flag of the frame buffer indexed by 1 to be on. It should be noted that last but one execution of step S318 has set the overwrite permission flag of the frame buffer indexed by 7. The lives of the frame buffers, excepting the frame buffers indexed by 1 and 7, are incremented by one.

In subsequent execution of step S33, the frame buffer indexed by 7, for example, is overwritten with newly captured image data and the life of the frame buffer indexed by 7 is set to 0 in step S309.

In the storage state B of FIG. 10, the life type index STP_NUM becomes 2 and the final life STAMP[2] becomes 7. In the storage state B, there are no frame buffer having the life of 7 (=STAMP[2]). However, the frame buffer indexed by 6 has the life of 19. Consequently, the determination result in step S316 for the frame buffer indexed by 6 is "NO" and the overwrite permission flag of the frame buffer indexed by 6 is set in step S318. Except the frame buffer indexed by 6 for which the overwrite permission flag is now set and the frame buffer indexed by 1 for which the overwrite permission flag has already been set, the lives of the frame buffers are incremented by one.

In the storage state C of FIG. 10, the life type index STP_NUM becomes 3 and the final life STAMP[3] becomes 11. In the storage state C, the life of the frame buffer indexed by 11 is 11, and the life of the frame buffer indexed by 4 is 19. Therefore, the determination result of step S316 for the frame buffer indexed by 4 is "NO" and the overwrite permission flag of the frame buffer 4 is set in step S318. For the frame buffer indexed by 11, the determination result of step S317 is "NO" and the overwrite permission flag of the frame buffer indexed by 11 is set in step S318. Except the frame buffers indexed by 4 and 11 for which the overwrite permission flags are set now and the frame buffer indexed by 6 for which the overwrite permission flag has already been on, the lives of the frame buffers are incremented. In the storage state D of FIG. 10, the life type index STP_NUM becomes 4 and the final life STAMP[4] becomes 7.

In the storage state D of FIG. 10, there are no frame buffer having the life of 7 (=STAMP[4]). However, the life of the frame buffer 8 is 19. Therefore, the determination result of step S316 for the frame buffer indexed by 8 is "NO" and the overwrite permission flag of the frame buffer indexed by 8 is set in step S318. The lives of the frame buffers are incremented, except the frame buffer indexed by 8 for which the overwrite permission flag is now set and the frame buffers indexed by 4 and 11 for which the overwrite permission flags have already been set.

In the storage state E of FIG. 10, the life type STP_NUM becomes 1 again, and the final life STAMP[1] becomes 19. Since the life of the frame buffer indexed by 2 comes to 19, the determination result of step S316 is "NO." The overwrite permission flag of the frame buffer indexed by 2 is set in step S318. The lives of the frame buffers are incremented, except the frame buffer indexed by 2 for which the overwrite permission flag is now set and the frame buffers indexed by 8 and 11 for which the overwrite permission flags have already been set.

Thereafter, when the counter I reaches 13, the determination result of step S315 becomes "NO" and consequently the flow goes from step S315 to S322. It is determined whether or not a command has been given to terminate image capture (step S322). In the absence of such a command ("NO" in step S322), the flow returns to step S307. Thus, the life setting processing in steps S309 to S313 and the life update processing in steps S315 to S321 are repeated until a command is given to terminate image capture.

When the shutter key is operated to give a command to terminate image capture, the processing according to the above flowcharts is terminated. Accordingly, when a command is given to terminate image capture in the storage state E of FIG. 10, for example, the processing terminates in a state where the twelve frame buffers have been storing images and associated time information. That is, since the process carried out in step S33 of FIG. 11 is an overwrite process, images are stored even in the frame buffers indexed by 2, 8 and 11, for which the overwrite permission flags are on. A total of twelve images and associated time information are respectively stored in all of the twelve frame buffers.

In the present embodiment, image capture is carried out at a frame rate of 4 fps and the number of frame buffers is 12. Therefore, if older images were sequentially erased and newer images were sequentially stored, only images captured up to three seconds before could be stored. According to the present embodiment, however, the decrement and overwrite are repeatedly executed at every ¼ second until maximal final life of 19; therefore, past images captured up to 4.75 seconds before can be stored.

Consequently, according to the present embodiment, it is possible to store even image data captured less recent past without a process of copying image data.

Moreover, the straightforward process of incrementing the life set up for each frame buffer allows even image data of the less recent past to be stored with no need to copy the image data.

The time sequence of stored images is irrelevant to order of indexes of the frame buffers. Therefore, to finally record continuously-captured image data (a moving image) consisting of frames of image data stored in the frame buffers into the storage memory 13 with a file name appended, the frames of image data may be arranged and recorded in order of time based on time information stored with the image data. Alternatively, it is also possible to record the frames of image data into the storage memory 13 without arranging the frames in order of time. When reproducing the frames of image data, the frames of image data may be read out from the storage memory 13 in order of time based on time information stored together.

According to the present embodiment, the initial life of zero is set for the frame buffers in the life setting processing in steps S309 through S312. However, as in the first embodiment, also a limit value of increment may be set for a frame buffer. In such a case, when a life of a frame buffer is incremented up to the limit value in steps S315 through S321 of the life update processing, corresponding overwrite permission flag may be set.

Also in the present embodiment, an empty frame entry timer may be used, similarly to the second embodiment. In such a case, upon an occurrence of a timeout of the timer, a search is made for a frame buffer having a live which is equal to or more than 16, for example, except a frame buffer for which the overwrite permission flag is set. Then the overwrite permission flag of found out frame buffer may be set.

In the above embodiments, described is such a configuration that: the number of provided frame buffers is 12; frame rate for continuous image capture is 4 fps; N_BUFFER=12; LIFE[I]=19 to 0; N_STAMP=4; and STAMP[STP_NUM]=19, 7, 11 and 7. However, such a configuration is provided by way of example, and appropriate modifications of the configuration can be made.

In the above embodiments, described is such a case that the present invention is applied to capturing past images. However, the invention may be applied to capturing past images and future images in such a manner that capturing the past is performed until a trigger is occurred and capturing the future is performed after the trigger. In this case, when capturing the future it is desired to perform the above-described processing for capturing the past.

What is claimed is:

1. An image storage apparatus comprising:

an image capture unit configured to cyclically capture images of a subject;

a storage unit including storage areas to store the images of the subject captured by the image capture unit;

a storage controller configured to overwrite a storage area which is permitted to be overwritten with an image of the subject captured by the image capture unit;

a life setting unit configured to respond to an overwriting by the storage controller and to set a life of the storage area which is overwritten by the storage controller;

a life controller configured to gradually change the life of the storage area set by the life setting unit;

a synchronization controller configured to bring the overwrite performed by the storage controller into synchronization with the change of the life made by the life controller;

a determination unit configured to determine whether or not the life of the storage area changed by the life controller has expired;

a permission unit configured to permit overwrite of a storage area when the determination unit determines that the life of the storage area has expired;

a trigger generation unit configured to generate a trigger; and a capture controller configured to repeatedly operate the storage controller, the life setting unit, the determination unit, and the permission unit until the trigger generation unit generates the trigger.

2. The image storage apparatus according to claim 1, wherein the life controller changes the life at a regular interval.

3. The image storage apparatus according to claim 1, wherein the permission unit includes a unit configured to search at regular intervals for a storage area having an expired life and to permit the overwrite of the storage area having the expired life.

4. The image storage apparatus according to claim 1, wherein:

the life setting unit sets a value of the life of a storage area in the storage unit for each of the storage areas, the life controller decrements the value of the life of the storage area set by the life setting unit, the determination unit determines whether or not the value of the life of the storage area decremented by the life controller reaches a predetermined value, and the permission unit permits the overwrite of a storage area when the determination unit determines that the value of the life of the storage area reaches the predetermined value.

5. The image storage apparatus according to claim 4, wherein the predetermined value includes zero.

6. The image storage apparatus according to claim 4, wherein the permission unit includes an assigning unit configured to compulsorily assign the predetermined value to the value of the life of the storage area in the storage unit at regular intervals, and wherein the permission unit permits the overwrite of the storage area having the value of the life to which the predetermined value is assigned.

7. The image storage apparatus according to claim 4, wherein the life setting unit sets a different value of the life for each of the storage areas.

8. The image storage apparatus according to claim 4, wherein the life setting unit sets a different value of the life for each of the storage areas in accordance with a storage timing at which an image of the subject is stored in a corresponding storage area.

9. The image storage apparatus according to claim 1, wherein:

the life setting unit sets a predetermined value for each of the storage areas in the storage unit;

the life controller counts a value;

the determination unit determines whether or not the value counted by the life controller reaches the value set by the life setting unit, and the permission unit permits the overwrite of the storage area when the determination unit determines that the value counted by the life controller reaches the value set by the life setting unit.

10. The image storage apparatus according to claim 9, wherein the permission unit includes an assigning unit configured to compulsorily change the value of the storage area incremented by the life controller to the value set by the life setting unit and to permit the overwrite of the storage area to which the value set by the life setting unit is set.

11. The image storage apparatus according to claim 9, wherein the life setting unit sets a different value for each of the storage areas.

12. The image storage apparatus according to claim 9, wherein the life setting unit sets a different value for each of the storage areas in accordance with a storage timing of an image of the subject stored therein.

13. The image storage apparatus according to claim 1, further comprising:

a recording controller configured to record the images of the subject stored in the storage areas into recording means when the trigger generation unit generates the trigger.

14. An image storage method for an image storage apparatus comprising an image capture unit configured to cyclically capture images of a subject, a storage unit including storage areas to store the images of the subject captured by the image capture unit, and a trigger generation unit configured to generate a trigger, the method comprising:

overwriting a storage area which is permitted to be overwritten with an image of the subject captured by the image capture unit;

setting, in response to the overwriting, a life of the storage area which has been overwritten;

gradually changing the set life of the storage area;

bringing the overwrite of the storage area into synchronization with the changed life of the storage area;

determining whether or not the changed life of the storage area has expired; and permitting the overwrite of a storage area when it is determined that the life of the storage area has expired, wherein the overwriting, setting, changing, determining, and permitting operations are performed until the trigger is generated.

15. The image storage apparatus according to claim 2, wherein the regular interval comprises a cycle of image capture by the image capture unit.

* * * * *